United States Patent
Wilken et al.

(10) Patent No.: US 7,407,682 B2
(45) Date of Patent: Aug. 5, 2008

(54) METHOD OF MAINTAINING ASEPTIC CONDITIONS IN A JUICE PLANT IN BRIEF PRODUCTION STOPPAGES

(75) Inventors: Karsten Wilken, Kågeröd (SE); Lars-Ola Jeppsson, Lund (SE); Sven Wejfeldt, Furulund (SE)

(73) Assignee: Tetra Laval Hodings & Finanace S.A., Pully (CH)

( * ) Notice: Subject to any disclaimer, the term of this patent is extended or adjusted under 35 U.S.C. 154(b) by 617 days.

(21) Appl. No.: 10/507,761

(22) PCT Filed: Mar. 13, 2003

(86) PCT No.: PCT/SE03/00420

§ 371 (c)(1),
(2), (4) Date: May 20, 2005

(87) PCT Pub. No.: WO03/077685

PCT Pub. Date: Sep. 25, 2003

(65) Prior Publication Data

US 2005/0233041 A1    Oct. 20, 2005

(30) Foreign Application Priority Data

Mar. 15, 2002   (SE) .................................. 0200784

(51) Int. Cl.
*A23L 2/46* (2006.01)
(52) U.S. Cl. ................... 426/599; 426/511; 426/521
(58) Field of Classification Search ............... 426/590, 426/599, 511, 520–521
See application file for complete search history.

(56) References Cited

U.S. PATENT DOCUMENTS

| | | | |
|---|---|---|---|
| 2,712,504 A * | 7/1955 | Coulter | 426/491 |
| 4,416,194 A * | 11/1983 | Kemp | 99/275 |
| 4,684,531 A | 8/1987 | Torterotot | |
| 5,292,543 A | 3/1994 | Heath et al. | |
| 5,908,651 A * | 6/1999 | Gustavsson et al. | 426/399 |
| 6,136,362 A * | 10/2000 | Ashton | 426/521 |
| 6,599,546 B2 * | 7/2003 | Palaniappan | 426/231 |
| 7,334,706 B2 * | 2/2008 | Schroeder et al. | 222/148 |
| 2005/0031751 A1 * | 2/2005 | Weng et al. | 426/521 |
| 2005/0112258 A1 * | 5/2005 | Feldmeier | 426/521 |

* cited by examiner

*Primary Examiner*—Drew E Becker
(74) *Attorney, Agent, or Firm*—Buchanan Ingersoll & Rooney PC

(57) ABSTRACT

The present invention relates to a method for maintaining aseptic conditions in a juice plant in brief productional stoppages. The plant is of the type where juice concentrate is heated to a certain temperature in that steam is supplied to the concentrate. The juice concentrate is kept at this temperature in a holding tube during a certain interval of time. The juice concentrate is thereafter diluted with water to the correct dilution degree. In brief production stoppages, the supply of juice concentrate, steam and water is shut off. The pressure in the plant is maintained in that a stop valve closes and that steam is supplied in a small quantity through a by-pass conduit placed on the steam conduit. The stop valve is placed downstream of the supply of water. The holding tube which is insulated and connected to a heating loop maintains the temperature of the product in the holding tube.

4 Claims, 1 Drawing Sheet

Figure 1:
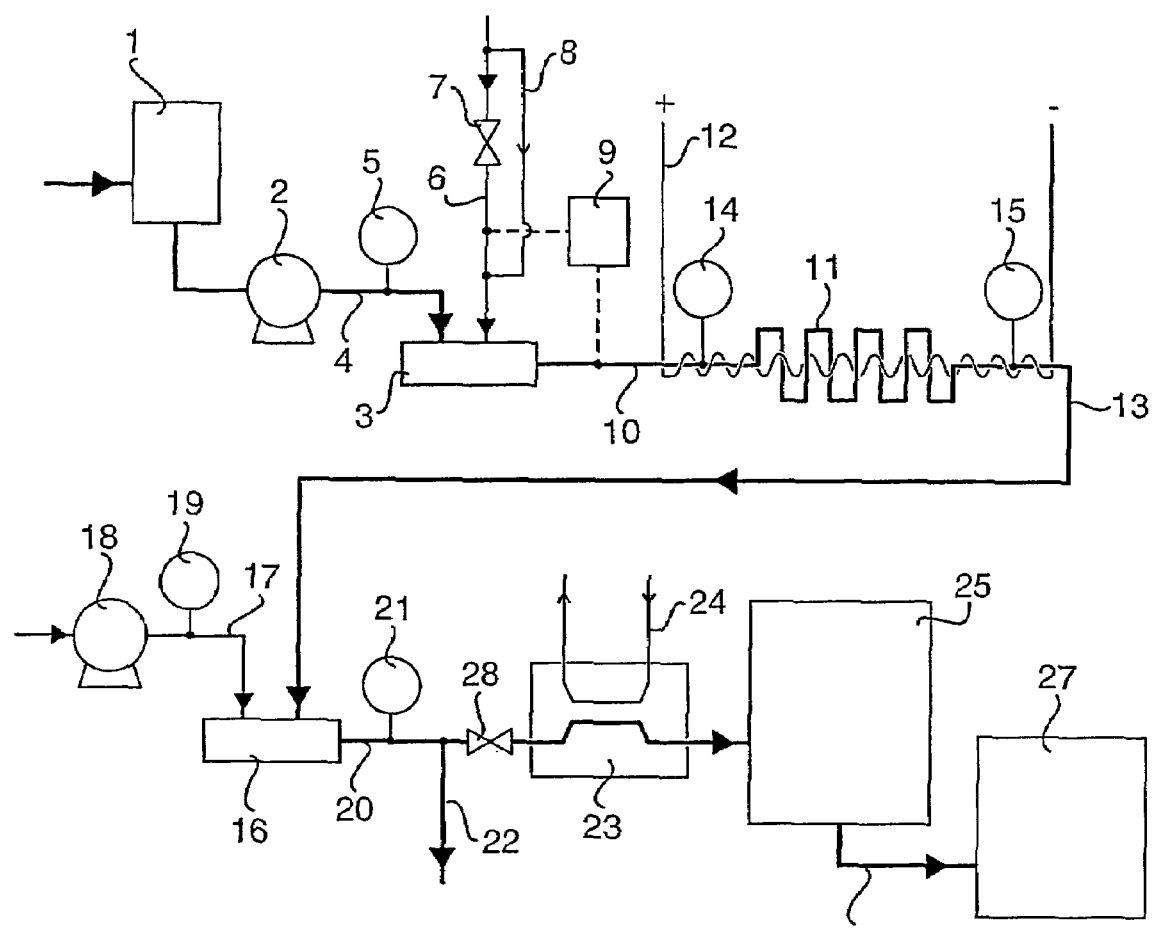

METHOD OF MAINTAINING ASEPTIC CONDITIONS IN A JUICE PLANT IN BRIEF PRODUCTION STOPPAGES

TECHNICAL FIELD

The present invention relates to a method of maintaining aseptic conditions in a juice plant in brief production stoppages, where the plant produces juice in that the juice concentrate is heated to a certain temperature when steam is supplied to the concentrate, that the concentrate is kept at this temperature in a buffer cell during a given period of time, and that the juice concentrate is thereafter diluted with water to the correct dilution degree.

BACKGROUND ART

Juice is defined as a drink containing 100% of that which may be extracted from fruit, vegetables or berries and which normally contains no additives. Beverages with a lower content are normally designated nectar or fruit drinks. For the production of juices, a common process is to take, as the point of departure, a juice concentrate extracted from the fruit or fruits which the intention is to use.

In a class on its own as the commonest juice beverage on the market is orange juice. However, the oranges are most generally not cultivated in those countries which are the major consumers of juice. In order to economise on transport costs of orange juice from the grower countries to the consumer countries, it is therefore necessary to concentrate the juice in the country of origin and transport the concentrate, which then constitutes only 15-20% of the finished juice product. Most generally, the concentrate is transported in the frozen state. In the consumer country, the concentrate must thereafter be diluted with water, i.e. it must be reconstituted in order to reassume its pristine composition and concentration. More than 90% of the world's orange juice production takes place in this manner.

The commonest method for reconstituting is that concentrate and water are mixed, either batchwise in large tanks or continuously in specific process equipment. Thereafter, the finished juice is pasteurised, cooled and packed in consumer packages. Methods which directly supply superheated water to the concentrate also exist. In this case, the product is thereafter cooled indirectly and packed in consumer packages.

Also in the production of juice from concentrate, so-called reconstituted juice, the aim is to approximate the flavour of freshly pressed juice, which is normally consumed immediately after extraction. Above all two factors affect the quality of the juice during this process, temperature and oxygen. In order to improve the product, attempts are made to expose the juice to as slight thermal action as possible, at the same time as it is important to obtain a product with reasonable shelf-life. The process should also be designed so that the action of oxygen is minimised. Oxygen oxidises and destroys vitamin C and thereby reduces the nutrient content of the juice.

At the same time, the process must be made rational with as short start- and stop-times as possible. The process should also be flexible so that it is possible to switch product rapidly and simply without major product losses. The process should also be capable of being used for different types of fruit or vegetable juices, including those which contain fibres.

One such method is described in U.S. Pat. No. 4,684,531. Steam is supplied to the juice concentrate so that a pasteurisation temperature is attained. The partly diluted juice concentrate is kept at this temperature during a given interval of time. Thereafter, water is added in the quantity required to obtain a reconstituted juice. The finished juice is thereafter packed in aseptic consumer packages.

In a plant for the production of juice, as described above, it may naturally occur that brief production stoppages happen because the filling machine temporarily stops. During these brief stoppages, which may be up to 15 minutes, it is vital to maintain aseptic conditions in the plant.

In other juice plants where hot water is added to the concentrated juice, it is only the supply of concentrate and water which has been stopped, and the quantity of juice which is in the buffer tank has had time to cool below pasteurisation temperature. In order to avoid a temperature alarm immediately after restart, the temperature signal has, in this instance, been masked. However, this procedure entails that there is a risk that a minor quantity of product in or ahead of the mixing tank is not sufficiently pasteurised.

In conventional pasteurisation plants for juice, using heat exchangers, the product is recycled over the pasteuriser constantly during brief stoppages. This entails that there is considerable consumption of energy even during operational stoppage.

OBJECTS OF THE INVENTION

One object of the present invention is to realise a method of maintaining aseptic conditions in a juice plant without the risk that the product does not attain sufficient pasteurisation temperature.

A further object of the present invention is to realise a juice plant which does not consume energy during operational stoppage and which may rapidly reassume productional position.

SOLUTION

These and other objects have been attained according to the present invention in that the method of the type described by way of introduction has been given the characterising feature that the plant, on brief production stoppages, shuts off the supply of juice concentrate, steam and water, that the pressure in the plant is maintained in that a stop valve placed downstream of the water supply closes and that steam is fed into the plant in a minor amount via a by-pass conduit, and that the buffer tank, which is insulated and connected to a heating loop maintains the temperature of the product in the buffer tank.

Preferred embodiments of the present invention have further been given the characterising features as set forth in the appended subclaims.

BRIEF DESCRIPTION OF THE ACCOMPANYING DRAWING

One preferred embodiment of the present invention will now be described in greater detail hereinbelow, with reference to the accompanying Drawing, in which:

FIG. 1 shows a flow diagram for a plant for the production of juice, nectar or fruit beverage, in the which the method according to the present invention may be employed.

DESCRIPTION OF PREFERRED EMBODIMENT

The plant which is shown in FIG. 1 comprises a tank 1 for concentrated juice. The juice concentrate is pumped by means of a pump 2 into a steam injector 3. The pump 2 is preferably a positive pump, such a lobe rotor pump or a screw pump. A flow meter 5 is disposed on the conduit 4 between the pump 2 and the injector 3.

The injector 3 may be of the type which is described in Swedish Patent Application SE 0004390-1. In the injector 3, pressurised steam is forced into the juice concentrate through a large number of holes which are provided in the casing surface of a tube, through which the product passes.

Steam is supplied to the injector 3 through a steam conduit 6 on which there is disposed a steam regulator valve 7. On the steam conduit 6, there is also disposed a by-pass conduit 8 where a minor quantity of steam may be permitted to pass into the injector 3, even when the steam regulator valve 7 is closed. During production, there is a valve (not shown on the Drawing) which closes the by-pass conduit 8 in order that it be possible accurately to control the quantity of steam which is fed into the process.

That the steam fed into the injector 3 is at the correct temperature is monitored by a control system 9 which ensures that the steam is at the correct pressure and, thereby, that it has the desired quantity of energy. In the injector 3, the juice concentrate is to be heated to approx. 85-115° C., depending upon what type of juice is treated and on what type of shelf-life is desired for the finished product.

From the outlet of the steam injector 3 there is a conduit 10 to a holding tube 11. In the holding tube 11, the product is to stay at the desired pasteurisation temperature for a certain interval of time. The time interval may be 15-30 seconds, depending upon what type of juice is treated and on what type of shelf-life is desired for the finished product.

In principle, the holding tube 11 consists of a helical or straight conduit of a certain length, or alternatively a combination of helical and straight conduit lengths. In the plant where the method according to the present invention is reduced into practice, the holding tube 11 is insulated and connected to an electric heating loop 12. After the holding tube 11, there is a conduit 13 which leads the product further in the plant.

In order to monitor that the product is at the correct temperature while staying in the holding tube 11, there is provided a temperature meter 14 on the conduit 10 into the holding tube 11, and a temperature meter 15 on the conduit 13 out from the holding tube 11.

The now ready pasteurised product, which consists of partly diluted juice concentrate, passes further through the plant to a mixer 16. The mixer 16 is of the type which is described in Swedish Patent Specification SE 0103591-4. In the mixer 16, the juice concentrate is lead into a current of water which is counter directed in relation to the concentrate current, whereafter the intermingled flow is forced to change direction so that a rapid and efficient mixing will be obtained.

The water which is added must be pasteurised or sterile filtered. The water is suitably de-aerated so that the quantity of oxygen (which may negatively affect the nutrient content and flavour of the juice) is thereby reduced. By de-aerating the water, it is possible to avoid the necessity that the juice, in a later stage in the process, needs to be de-aerated. When the finished juice is de-aerated, there is a risk of losing some of the aromatic substances which contribute in giving the juice a "fresher" flavour.

The water is added to the mixer 16 through a conduit 17, by means of a pump 18. The pump 18 preferably consists of a conventional positive pump, such as a screw pump or a lobe rotor pump. On the conduit 17, there is disposed a flow meter 19 for monitoring that the juice is being correctly reconstituted.

In a conduit 20 out from the mixer 16, there is now a reconstituted, pasteurised juice which, depending upon the temperature of the supplied water, is partly cooled. On the conduit 20 after the mixer, there is a meter 21 for monitoring that the juice has been reconstituted to the correct degree, i.e. that only that quantity of water which the juice originally had has been supplied in the process. The meter is normally a refractometer, but a density meter may also be employed. Incorrectly reconstituted juice departs from the plant through the conduit 22.

The finished product is thereafter finally cooled when necessary. The need of final cooling depends upon the mixing conditions and on the temperature of the water incoming into the mixer 16. For example, the final cooling may take place indirectly in a heat exchanger 23 where iced water or cold water is fed to the heat exchanger 23 through the conduit 24. Before the final cooling, there is a stop valve 28 disposed on the conduit 20.

The cooled product is thereafter conveyed to an aseptic buffer tank 25. The finished juice leaves the buffer tank through the conduit 26 and is thereafter filled into consumer packages in some form of filling machine 27. Depending upon the pasteurisation temperature which was employed in the process, the product is packed in packages either for distribution and sale at room temperature or in an unbroken refrigerated chain.

When brief production stoppages of up to 15 minutes occur in that a filling machine 27 stops, the plant must be capable of maintaining such conditions during the stoppage that there is no risk of jeopardising the aseptic conditions.

When a temporary stoppage occurs, the supply of juice concentrate is shut off in that the pump 2 stops. The supply of steam is stopped in that the steam regulator valve 7 closes. The water pump 18 is similarly stopped and no water will be supplied during the stoppage.

The pressure in the plant is maintained in that the stop valve 28 on the conduit 20 before the final cooling closes. At the same time, a certain quantity of steam will be supplied to the system via the bypass conduit which leads past the steam regulator valve 7. The small quantity of steam which, by such means, enters into the process during the stoppage also contributes in ensuring that concentrated juice which is located in the steam injector 3 cannot be forced out through the small holes in the casing surface of the injector conduit.

The juice which is located in the holding tube 11 is kept at the desired pasteurisation temperature throughout the stoppage, in that the electric heating loop 12 heats the insulated holding tube 11. The activation and deactivation of the heating loop are controlled by the temperature indicators 14 and 15. In that the product which is located in the holding tube 11 during the stoppage is maintained at pasteurisation temperature, there is no risk of an alarm for incorrect temperature after restart and as a result the temperature signals need not be masked.

When the filling machine 27 comes back on stream, product will be taken from the buffer tank 25 until such time as a stable state has been established. The stop valve 28 opens and thereafter once again starts the supplied concentrate, steam and water in that the concentrate pump 2 and the water pump 18 start and also that the steam valve 7 opens. Throughout all of the time of duration of the brief operational stoppage, the plant has not consumed any energy, restart functions rapidly and product quality is maintained. Nor does the brief operational stoppage give rise to any losses.

Should the stoppage be longer than 15 minutes, the method according to the present invention permits the plant to be filled with water. Water is taken in to the conduit at the concentrate pump 2 and can once again be removed at the return conduit 22. This permits relatively rapid draining of water out of the system and restart of the plant also after lengthier operational stoppages.

As will have been apparent from the foregoing description, the present invention realises a method of being able to maintain aseptic conditions in a juice production plant during brief operational stoppages without the plant needing to be stopped to be cleaned and resterilised. The method also entails that the plant does not consume any energy during the stoppage and the restart may take place rapidly and reliably.

What is claimed is:

1. A method of maintaining aseptic conditions in a juice plant in brief productional stoppages, where the plant produces juice in that juice concentrate is heated to a certain temperature when steam is supplied to the concentrate, that the juice concentrate is kept at this temperature in a holding tube for a certain interval of time, and that the juice concentrate is thereafter diluted with water to the correct dilution degree, wherein the plant, in brief production stoppages, shuts off the supply of juice concentrate, steam and water; that the pressure in the plant is maintained in that a stop valve placed downstream of the water supply closes; and that the steam is supplied to the installation in a small quantity via a by-pass conduit; and that the holding tube which is insulated and connected to a heating loop maintains the temperature of the product in the holding tube.

2. The method as claimed in claim 1, wherein the stream is supplied to the juice concentrate in an injector.

3. The method as claimed in claim 1, wherein the water is supplied to the juice concentrate in a continuous mixer.

4. The method as claimed in claim 1, wherein the activation and deactivation of the heating loop during productional stoppage are controlled by temperture indicators.

\* \* \* \* \*